United States Patent Office 2,850,477
Patented Sept. 2, 1958

2,850,477

POLYMERIC VINYLCARBAZOLE FIBER-FORMING COMPOSITIONS

George E. Ham, Decatur, Ala., assignor to The Chemstrand Corporation, Decatur, Ala., a corporation of Delaware No Drawing. Application November 10, 1952
Serial No. 319,789

14 Claims. (Cl. 260—45.5)

This invention relates to new copolymers and to new polymeric compositions, valuable in the preparation of fibers, formed therefrom. More particularly, the invention relates to new polynuclear copolymers and further, to acrylonitrile polymers comprising said polynuclear copolymers which are capable of being dyed by conventional procedures, especially with acid type dyestuffs.

It is well-known that polyacrylonitrile and copolymers of acrylonitrile and other mono-olefinic polymerizable monomers are excellent fiber-forming copolymers. The polyacrylonitrile and copolymers of more than 75 percent acrylonitrile and up to 25 percent of monomers, such as vinyl acetate and other esters of monocarboxylic acids, methyl methacrylate and other alkyl esters of methacrylic or acrylic acids, styrene and other vinyl-substituted aromatic hydrocarbons, vinylidene chloride, and methacrylonitrile, produce fibers with superior tensile properties, desirable elongation, and excellent stability under a wide range of physical and chemical conditions. These polymers and the fibers produced therefrom are subject to various disabilities which greatly restrict their utility as general purpose fibers. For example, the fibers do not have sufficient dye-affinity to enable the development of satisfactory colored fibers, and the limited range of colors produced by conventional dyeing techniques are not stable to laundering and dry-cleaning procedures.

Further, it is well-known that polyacrylonitrile and acrylonitrile copolymers may be modified by admixing different polymeric substances. Accordingly, it is a primary object of the present invention to provide new copolymers which, when admixed with polyacrylonitrile and acrylonitrile copolymers, such as by blending, improve the dye-affinity thereof and, in addition, reduce the shrinkage at high temperatures of shaped articles produced from said acrylonitrile polymer compositions and improve the washing and dry-cleaning fastness thereof. It is another object of the invention to provide new fiber-forming acrylonitrile polymer compositions. Other objects and advantages of the present invention will be apparent from the description thereof hereinafter.

"Polymer," as employed throughout the instant specification and claims, is intended to include polyacrylonitrile, and copolymers of acrylonitrile.

While the present invention is applicable to all shaped articles, such as fibers, films, foils, rods, strands, etc., for simplicity of description, the same will be described as it is applicable to fibers, it being understood that this is merely intended in an illustrative sense and the invention should not be limited thereby, but only insofar as the same may be limited by the appended claims.

In accordance with this invention it has been found that new and valuable copolymers can be prepared by copolymerizing N-vinylcarbazole with a basic monomer, such as the various unsaturated nitrogen-containing heterocyclic monomers. It has been further found that these new copolymers of N-vinylcarbazole and basic unsaturated nitrogen-containing heterocyclic monomers can be blended with acrylonitrile polymers to develop improved dye-receptivity therein.

Among the various basic monomers which may be polymerized with N-vinylcarbazole in accordance with the present invention are the vinylpyridines, such as 2-vinylpyridine, 4-vinylpyridine, and the like, the alkyl-substituted vinylpyridines, such as 2-methyl-5-vinylpyridine, 5-methyl-2-vinylpyridine, 2-ethyl-5-vinylpyridine, and the like, N-vinylimidazole, vinylpyrazine, N-vinylbenzimidazole, N-allybenzimidazole, N-vinylpyrrolidone, and N-vinylpiperidone.

In the practice of the present invention it has been found that suitable results are obtained when copolymers containing 20 to 80 percent by weight of vinylcarbazole and 80 to 20 percent of the unsaturated nitrogen-containing heterocyclic monomer are employed. When these copolymers are blended with polyacrylonitrile and the copolymers of acrylonitrile, the vinylcarbazole copolymers should be employed in an amount to give an overall basic monomer content, based on the weight of the blend, of one to 10 percent by weight. For example, suitable blending compositions are those containing 70 to 99 percent by weight of the acrylonitrile polymer and one to 30 percent by weight of the vinylcarbazole copolymer.

The acrylonitrile polymers which may be modified by the incorporation of polymers of N-vinylcarbazole are polyacrylonitrile and copolymers of at least 75 percent by weight of acrylonitrile and up to 25 percent of mono-olefinic polymerizable monomers, such as vinyl acetate and other vinyl esters of monocarboxylic acids having up to four carbon atoms, methyl methacrylate and other alkyl methacrylates having up to four carbon atoms in the alkyl radical, methyl acrylate and other alkyl acrylates having up to four carbon atoms in the alkyl groups, dimethyl fumarate and other dialkyl fumarates having up to four carbon atoms in the alkyl groups, dimethyl maleate and other dialkyl maleates having up to four carbon atoms in the alkyl groups, styrene, alpha-methylstyrene, and other vinyl or isopropenyl substituted aromatic hydrocarbons, vinyl chloroacetate and other vinyl esters of halo-substituted acetic acids, vinylidene chloride, methacrylonitrile, etc. Particularly suitable polymers for the preparation of fibers, filaments, and the like, are those containing from 85 to 98 percent of acrylonitrile and from 2 to 15 percent of mono-olefinic polymerizable monomers, such as enumerated hereinbefore.

Blends of the acrylonitrile polymers and the blending N-vinylcarbazole polymers may be prepared by mechanically mixing the dry polymers in finely divided form. Thereafter the mixture or blend may be dissolved in a suitable solvent and fabricated into fibers and other shaped articles by conventional methods. For optimum mixing, however, it is preferred to perform the blending when both polymers are dissolved in a common solvent. Suitable solvents will usually be the same solvents from which the blended polymer is spun into fibers, such as N,N-dimethylformamide, N,N-dimethylacetamide, ethylene carbonate, gamma-butyrolactone, alpha-cyanoacetamide, maleic anhydride, and like or other solvents known to have the property of dissolving acrylonitrile polymers.

In the practice of the present invention, the physical properties of the polymers are of substantial importance. It is desirable that the polymers be uniform with respect to molecular weight, particle size, and chemical composition. Accordingly, the methods for their preparation must be selected so as to induce the uniformity of chemical and physical properties. In general, the molecular weight of the polymers should be in excess of 10,000 and preferably in excess of 25,000, the molecular weights being determined by measuring the viscosity of dilute solutions in the manner well-known in the art.

It has been found that the acrylonitrile polymers and the blending N-vinylcarbazole polymers may be prepared by various polymerization procedures and attain the desirable chemical and physical properties. For example, mass polymerization techniques may be employed wherein the monomers to be polymerized are mixed together with an appropriate amount of a suitable catalyst, such as named hereinafter, placed in a reaction vessel and heated to a temperature at which polymerization takes place. The only limitation on this procedure is that persulfate and related inorganic catalysts cannot be employed since they are insoluble in the monomers. The polymers may also be prepared by the so-called emulsions or suspension polymerization method in an aqueous medium. These polymerizations usually require a free radical type of catalyst and emulsifying or dispersing agents. The methods of preparation preferably utilize a mixed monomer addition technique whereby the monomers are mixed in the proportions desired in the ultimate polymer and added continuously to the reaction medium throughout the course of the reaction. The various details of the polymerization method should be so selected in order to produce polymers of substantially uniform physical and chemical characteristics.

The reactions may be catalyzed with a wide variety of free radical producing substances, such as the peroxy compounds, and preferably those which are water-soluble when the emulsion or suspension polymerization method is employed, for example, hydrogen peroxide, sodium peroxide, potassium persulfate, calcium percarbonate, and other salts of peroxy acids. In the preparation of some of the acrylonitrile polymers, the peroxy acid salts are not suitable. In these cases the azo catalysts are often found to be satisfactory. Suitable azo catalysts are azo-2,2'-diisobutyronitrile, dimethyl-2,2'-azodiisobutyrate, 2,2'-azobis(2,4-dimethyl valeronitrile), and 2,2'-azodiisobutyramide. In addition, diazoaminobenzene and its derivatives may be employed as catalysts. The azo catalysts have been found to be desirable in the preparation of the blending polymers of N-vinylcarbazole.

The emulsion or dispersing agents which may be employed are those compounds which have both a hydrophilic and a hydrophobic radical. Suitable compounds include the common soaps, such as sodium stearate and other alkali metal salts of high molecular weight, carboxylic acids and mixtures thereof as obtained by the saponification of animal and vegetable fats, the salts of sulfonated hydrocarbons, for example, the alkali metal salts of sulfonated paraffins, sulfonated naphthalenes, and sulfonated alkylbenzenes, the salts of formaldehyde condensed sulfonic acids and particularly the sodium salt of formaldehyde condensed alkylaryl sulfonic acids, the salts of triethanolamine and other "amino soaps," and alkali salts of sulfonic half esters of fatty alcohols.

If desired, the various polymers, useful in the practice of the present invention, may be prepared by the "redox" method in the presence of sulfur dioxide, sodium bisulfite, sodium thiosulfate and other compounds containing sulfur in the lower valent stage. The use of the "redox" system usually permits operation at lower temperature and results in the formation of copolymers of high molecular weight.

The polymerizations may also be conducted in the presence of molecular weight regulators, for example, t-dodecyl mercaptan, thioglycolic acid, thiourea, mercaptobenzothiazole, and carbon tetrachloride. These and other well-known regulators prevent the formation of very high molecular weight polymer increments and tend to induce a more uniform size of polymer molecules.

The fiber-forming compositions or blends of the instant invention are formed into fibers by dissolving the polymer blend in a suitable solvent therefor, such as N,N-dimethylformamide, N,N-dimethylacetamide, ethylene carbonate, and the like, to form a "dope" and thereafter extruding the solution or "dope" through a spinneret into a coagulating medium. It is desirable to use a solution of as high a concentration as possible, but the maximum concentration is dependent upon the molecular weight of the polymer and the viscosity characteristics of the polymer-solvent mixture. Although as little as 5 percent of polymer can be used in the spinning solution, such low concentrations are undesirable because they necessitate the removal of too much solvent from the extruded solution, thereby increasing solvent recovery cost as well as reducing spinning speed and lengthening the period required for coagulation. The concentration of polymer in the spinning solution is usually between 8 and 35 percent, but concentrations up to the maximum are practicable.

The fibers are spun by extruding the polymer solution through an orifice, or a spinneret having a plurality of orifices, into a medium which removes the solvent. The medium into which the solution or "dope" is extruded and which removes the solvent may be a gas, such as air, nitrogen, and the like, or a liquid, such as water, alcohol, salt solutions, or any liquid which is miscible with the solvent, but in which the polymer blend is insoluble. When employing a liquid or the "wet spinning" method, the solvent is leached out of the stream of polymer solution which becomes a viscous stream and finally a solid filament. In general, the methods of wet spinning and dry spinning which are in commercial use are readily adaptable to spinning solutions of the polymer blends of the instant invention. Similarly, conventional automatic machinery for spinning continuously, drying the thread if necessary and winding it upon suitable spools can be used. As in the case of most synthetic fibers, those produced from the polymers or polymer blends of the instant invention, must be oriented by stretching to develop optimum physical properties. If desired, part of this stretching may be accomplished in the spin bath, by drawing the fiber out of the bath more rapidly than the rate of extrusion.

Further details of the practice of the present invention are set forth with respect to the following examples, which are merely intended to be illustrative and not limitative. In the examples, all parts and percentages are by weight unless otherwise indicated.

*Example 1*

A solution of 10 parts of N-vinylimidazole, 10 parts of N-vinylcarbazole, and 0.1 part of azo-diisobutyronitrile was heated in a French square bottle for two hours at 60° C. and 17.5 hours at 80° C. A hard foamed clear mass was obtained which was soluble in N,N-dimethylacetamide, ethyl alcohol and hexane. Essentially 100 percent conversion to copolymer was obtained. The copolymer possessed a specific viscosity in N,N-dimethylformamide of 0.027. A 17 percent solids solution in N,N-dimethylacetamide was prepared of a mixture of 94 percent of a copolymer of 97 percent acrylonitrile and 3 percent vinyl acetate and 6 percent of the copolymer of 50 percent N-vinylcarbazole and 50 percent N-vinylimidazole. This solution was spun into a mixture of 60 percent N,N-dimethylacetamide and 40 percent water, using a spinneret containing 30 holes, each 0.0035 inch in diameter. The fiber produced was continuously washed, dried on steam-heated rolls and stretched 312 percent in the presence of steam. The fiber had a tenacity of 1.6 grams per denier and an elongation of 2 to 3 percent. A knot strength of 1.2 grams per denier and a relative knot strength of 73.9 percent were noted. The fiber was dyed readily to a medium scarlet shade with a mixture of 2 percent Wool Fast Scarlet and 10 percent sulfuric acid (based on the fiber weight) and a 40 to one dye bath to fiber ratio after two hours at boiling. Using 10 percent Wool Fast Scarlet, based on the fiber weight, a medium dark scarlet shade was obtained. The dry shrinkage of the fiber at 190° C. was 5 percent and at 255° C. was 10 percent.

By comparison, a fiber of similar dyeability comprised of a blend of 94 percent of a copolymer of 97 percent by weight of acrylonitrile and 3 percent vinyl acetate and 6 percent of a copolymer of 50 percent by weight of N-vinylimidazole and 50 percent acrylonitrile, prepared in the manner outlined above, possessed a dry shrinkage at 170° C. of 5 percent and at 215° C. of 10 percent.

*Example II*

A solution of 2.0 parts of N-vinylcarbazole, 2.0 parts of 2-methyl-5-vinylpyridine and 0.04 part of azo-diisobutyronitrile was placed in an oven at 60° C. for a period of three days. A hard milky mass was obtained, which was dissolved in N,N-dimethlyacetamide and precipitated in hexane. Approximately 100 percent conversion to copolymer was obtained. A 17 percent solids solution in N,N-dimethylacetamide was prepared of a mixture or blend of 91.6 percent of a copolymer of 94 percent acrylonitrile and 6 percent vinyl acetate and 8.4 percent of a copolymer of 50 percent of 2-methyl-5-vinylpyridine and 50 percent of N-vinylcarbazole. This solution was spun and the fiber treated and stretched 281 percent as described in Example I. A white fiber of 3.1 grams per denier tenacity and 6 to 8 percent elongation was obtained. The fiber was dyed a medium dark shade at 2 percent Wool Fast Scarlet and a very dark shade at 10 percent Wool Fast Scarlet.

A similar blend, but with a copolymer of 97 percent acrylonitrile and 3 percent vinyl acetate replacing the 94 percent acrylonitrile-6 percent vinyl acetate copolymer was prepared and spun as outlined above. The fibers were stretched 405 percent and were found to possess a tenacity of 2.5 grams per denier and elongation of 4 to 5 percent. The fibers were dyed a medium dark shade at 2 percent Wool Fast Scarlet and a very dark shade at 10 percent Wool Fast Scarlet.

The washing and dry-cleaning fastness of all the above samples was good.

*Example III*

A mixture of 17.5 parts of N-vinylimidazole, 7.5 parts of N-vinylcarbazole and 0.025 part of azo-diisobutyronitrile was placed in a French square bottle and heated for two hours at 75° C. and two weeks at 85° C. A hard, clear copolymer was obtained. A mixture of 7.5 parts of N-vinylimidazole, 18.5 parts of N-vinylcarbazole and 0.025 part of azo-diisobutyronitrile was heated in the same way with similar results.

The new copolymers of the instant invention comprising N-vinylcarbazole and a polymerizable basic unsaturated nitrogen-containing heterocyclic monomer are also useful as ion exchange resins. In the case of ion exchange resins it is usually desirable to add a cross-linking agent, such as a divinyl or polyvinyl compound, to render it more insoluble. The copolymers are film-forming and may be molded into various articles.

It is to be understood that changes and variations may be made without departing from the spirit and scope of the present invention as defined in the appended claims.

I claim:

1. A dyeable, heat-stable composition of matter which is capable of being formed into fibers and filaments comprising a solution blended intimate mixture of one to 30 percent of (A) a copolymer of 20 to 80 percent by weight of N-vinylcarbazole and 80 to 20 percent by weight of a polymerizable monomer selected from the group consisting of vinylpyridines, alkyl-substituted vinylpyridines, N - vinylimidazole, vinylpyrazine, N - vinylbenzimidazole, N - allylbenzimidazole, N - vinylpyrrolidone, and N - vinylpiperidone, and 70 to 99 percent of (B) a polymer of at least 75 percent by weight of acrylonitrile and up to 25 percent of another polymerizable mono-olefinic monomer.

2. The composition as defined in claim 1 wherein the polymerizable monomer of (A) is 2-vinylpyridine.

3. The composition as defined in claim 1 wherein the polymerizable monomer of (A) is 2-methyl-5-vinylpyridine.

4. The composition as defined in claim 1 wherein the polymerizable monomer of (A) is N-vinylimidazole.

5. The composition as defined in claim 1 wherein the polymerizable monomer of (A) is vinylpyrazine.

6. The composition as defined in claim 1 wherein the polymerizable monomer of (A) is N-allylbenzimidazole.

7. A dyeable, heat-stable composition of matter which is capable of being formed into fibers and filaments comprising a solution blended intimate mixture of one to 30 percent of (A) a copolymer of 20 to 80 percent by weight of N-vinylcarbazole and 80 to 20 percent by weight of a polymerizable monomer selected from the group consisting of vinylpyridines, alkyl-substituted vinylpyridines, N-vinylimidazole, vinylpyrazine, N-vinylbenzimidazole, N - allylbenzimidazole, N - vinylpyrrolidone, and N-vinylpiperidone, and 70 to 99 percent of (B) a copolymer of 85 to 98 percent of acrylonitrile and from two to 15 percent of another polymerizable mono-olefinic monomer.

8. The composition as defined in claim 7 wherein the polymerizable mono-olefinic monomer of (B) is vinyl acetate.

9. A dyeable, heat-stable composition of matter which is capable of being formed into fibers and filaments comprising a solution blended intimate mixture of (A) a copolymer containing by weight in the polymer molecule from 20 to 80 percent of N-vinylcarbazole and 80 to 20 percent of a polymerizable basic monomer selected from the group consisting of vinylpyridines, alkyl-substituted vinylpyridines, N - vinylimidazole, vinylpyrazine, N - vinylbenzimidazole, N - allylbenzimidazole, N - vinylpyrrolidone, and N - vinylpiperidone, with a sufficient quantity of (B) a polymer containing by weight in the polymer molecule at least 75 percent of acrylonitrile and up to 25 percent of other polymerizable mono-olefinic monomers, to give an overall polymerizable basic monomer content, based on the weight of the blend, of 1 to 10 percent by weight.

10. The composition as defined in claim 9 wherein the polymerizable monomer of (A) is 2-vinylpyridine.

11. The composition as defined in claim 9 wherein the polymerizable monomer of (A) is 2-methyl-5-vinylpyridine.

12. The composition as defined in claim 9 wherein the polymerizable monomer of (A) is N-vinylimidazole.

13. The composition as defined in claim 9 wherein the polymerizable monomer of (A) is vinylpyrazine.

14. The composition as defined in claim 9 wherein the polymerizable monomer of (A) is N-allylbenzimidazole.

References Cited in the file of this patent

UNITED STATES PATENTS

| Number | Name | Date |
|---|---|---|
| 2,520,959 | Powers | Sept. 5, 1950 |
| 2,527,863 | Webb | Oct. 31, 1950 |
| 2,550,652 | Drechsel et al. | Apr. 24, 1951 |
| 2,606,175 | Price | Aug. 5, 1952 |
| 2,643,990 | Ham | June 30, 1953 |
| 2,769,793 | Ham | Nov. 6, 1956 |